United States Patent [15] 3,643,084
Moore [45] Feb. 15, 1972

[54] EXTENSIBLE UNIVERSALLY POSITIONABLE DEVICE

[72] Inventor: William C. Moore, Qtrs. 57-B Rice St., Bolling AFB, Washington, D.C. 20332

[22] Filed: Nov. 10, 1969

[21] Appl. No.: 875,381

[52] U.S. Cl. ................... 240/10.67, 240/6.4 R, 240/10.6 R, 240/52.1
[51] Int. Cl. ................. F21l 13/04, F21v 21/08, F21v 21/28
[58] Field of Search ............... 240/10.6 CH, 10.6 R, 67, 81.8, 240/218, 70, 6.4 F, 57, 10.67, DIG. 5, 8.18, 78 HA; 248/161, 181, 179

[56] References Cited

UNITED STATES PATENTS

| | | | |
|---|---|---|---|
| 1,398,011 | 11/1921 | Errington | 240/8.18 |
| 1,403,863 | 1/1922 | Peat | 240/67 X |
| 1,562,994 | 11/1925 | Stewart | 248/226 |
| 1,857,050 | 5/1932 | Jones | 248/224 |
| 2,684,822 | 7/1954 | Odin | 248/179 |
| 2,874,269 | 2/1959 | Greenlee | 240/8.16 |
| 3,368,068 | 2/1968 | Cronheim | 240/67 |
| 3,378,681 | 4/1968 | Meyer et al. | 240/8.18 |

FOREIGN PATENTS OR APPLICATIONS 881,395  6/1953  Germany ............................ 240/70

*Primary Examiner*—S. Clement Swisher
*Assistant Examiner*—Daniel M. Yasich
*Attorney*—Low & Matthews

[57] ABSTRACT

A versatile universally positionable portable device which preferably is provided with an illumination unit for illuminating desired areas such as an aircraft instrument panel or any selected cockpit area, wherein the device includes a housing having coaxial oppositely directed telescoping sectional units provided at their respective opposite ends with swivel assemblies to permit universal positioning of the device as found necessary or desirable by the user thereof.

12 Claims, 1 Drawing Figure

PATENTED FEB 15 1972  3,643,084
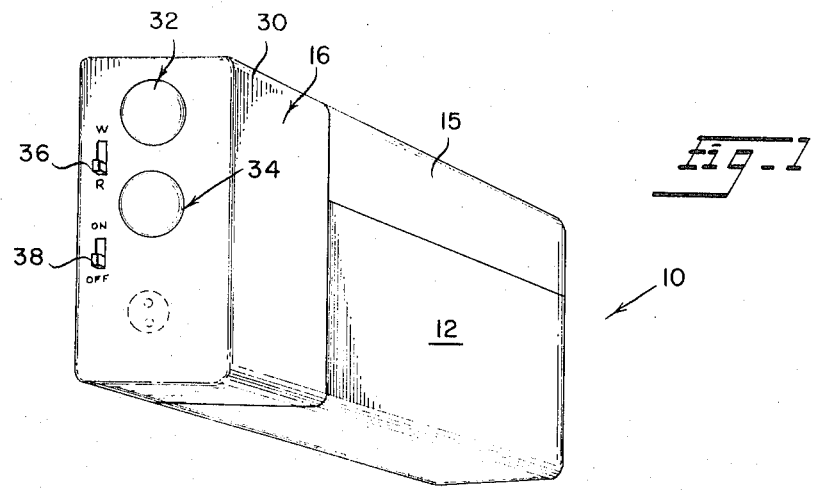
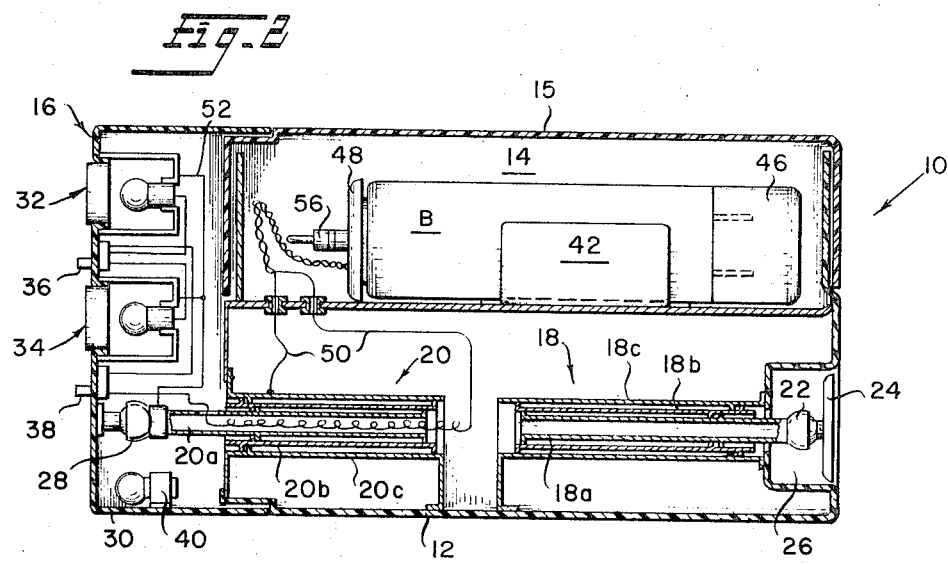
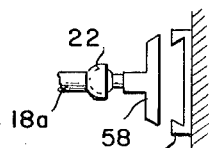
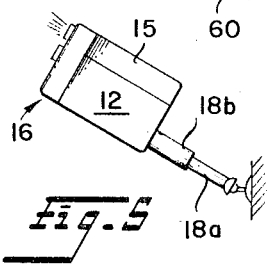
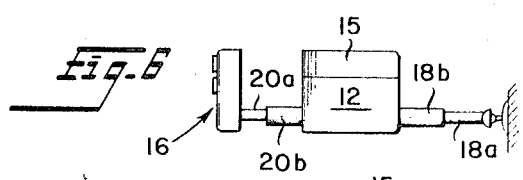
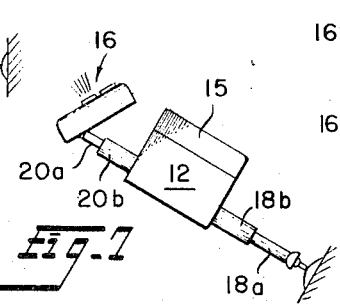
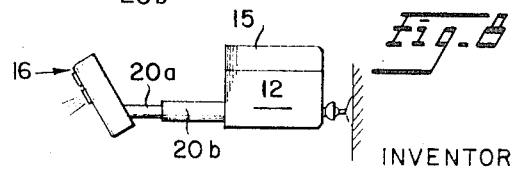
INVENTOR
William C. Moore
By Rose & Matthews
ATTORNEYS

EXTENSIBLE UNIVERSALLY POSITIONABLE DEVICE

BACKGROUND OF THE INVENTION

The present invention relates to a portable, universally positionable device, and particularly as adapted for illumination purposes in aircraft for illuminating an instrument panel or portions thereof, as well as any required cockpit area, without requiring the pilot or other crew member to grasp and continuously manually hold the device, thereby freeing his hands for necessary duties.

There exists a definite and practical need for a portable and universally positionable light which need not be continuously hand-held. An illustrative use of such a device for which need now exists is within the cockpit of aircraft for selectively illuminating any portion of an instrument panel, controls, charts, etc., as may be required by the pilot or crew during nighttime operations. Heretofore, flashlights and the like have required that the user hold the unit in his hand in order to have the necessary positional flexibility to illuminate any particular area. The hazards of such preexisting devices are evident, as they require the pilot to relinquish partial control of the aircraft with his hand in manipulating the light assembly.

In an effort to overcome this major disadvantage, some prior art units have been developed which are permanently affixed to the aircraft, whereby the operator does not need to manually grasp the same. Such devices, however, lack the flexibility or portability to accommodate varying requirements or necessary locales of use as may be encountered.

Accordingly, there exists a hitherto unfilled need for a versatile and portable universally positionable device, and preferably incorporating a selective red-white illumination unit when for aircraft use. The device is desirably characterized by compact dimensions, while yet retaining absolute versatility in throwing a red or white beam to any desired locale in the cockpit, and wherein also the illumination unit does not require that it be hand-held by the pilot or other crew member during use.

Further, such a device for illumination purposes should be battery powered, preferably by a rechargeable battery, as well as having provision for external power coupling from a suitable jack.

BRIEF DESCRIPTION OF THE PRIOR ART

Adjustable devices having illumination means of varying types are commonly found in Classes 240 and 248 of the U.S. Pat. Office search classification system. Typical patents relating to the aircraft cockpit problems aforediscussed include Greenlee U.S. Pat. Nos. 2,874,269, and Dircksen 2,347,671. It will be seen upon inspection that these prior art devices do not possess the structural advantages and operational features of the subject invention as presented hereinafter, nor as aforesaid is any comparable advantageous device currently available on the market.

Further, there have been many efforts in the prior art to develop adjustable or flexible illumination devices generally to enhance the versatility thereof, as typified by Cohen U.S. Pat. No. 2,753,000, Waskie 2,796,515, Oldenburger 3,259,011 and Muller D-213,902. These and other related prior art devices likewise lack the structure, and accordingly fail to achieve the results, of the subject invention.

BRIEF SUMMARY OF THE INVENTION

The present invention overcomes the disadvantages of prior art structures, and provides a unique and highly advantageous universally positionable device of compact dimensions having illumination means for aircraft cockpit areas, and is suitable for diverse other utilitarian purposes apart from the environment of aircraft use.

The device includes a housing having two substantially axially aligned, oppositely directed, telescoping sectional units therein, one telescopic extension unit having mounting means thereon for attaching the housing in or onto a suitable area of an aircraft or other environment, while the other telescoping unit is provided with an illuminating unit. The housing, in addition to receiving the telescoping units, also includes a battery compartment for a power supply such as a rechargeable battery. Each telescoping unit is connected to its mounting means and illumination unit, respectively, by a swivel joint, whereby universal positioning of the device as requisite in any given environment may be easily achieved. The relation of the illumination unit and the battery compartment cover to the housing permits a compact configuration of the device.

DESCRIPTION OF THE DRAWINGS

A preferred form of the invention is shown in the accompanying drawings, in which:

FIG. 1 is a perspective elevation of the device of the present invention;

FIG. 2 is a sectional side elevation view through the device;

FIG. 3 is a fragmentary view of a modified mounting means;

FIG. 4 is a fragmentary view of a further modified mounting means; and,

FIGS. 5, 6, 7 and 8 are illustrative of various extended and adjusted positions of the device demonstrating the versatility thereof.

DESCRIPTION OF THE ILLUSTRATED EMBODIMENT

The universally positionable portable device 10 of the present invention includes a housing 12 having a battery compartment 14 associated therewith and having a cover 15 therefor.

The illumination unit 16 extends across the forward end of the housing 12.

Housing 12 receives and mounts therein a pair of axially aligned multisection telescoping units 18 and 20. The telescoping units comprise, respectively, a plurality of telescoping sections 18a, 18b, 18c and 20a, 20b, 20c of conventional form, and are preferably metallic. Either assembly 18 or 20 extends to any point within its maximum length as desired upon axial separating movement of the respective telescoping sections, as is usual with such units, and are frictionally held at the selected extended position. The largest diameter sections 18c and 20c are affixed to housing 12, which latter is apertured to permit extension and retraction of the sections therethrough.

With respect to telescoping unit 18, the smallest diameter and innermost section 18a thereof is provided with pivot means, such as a ball and socket joint 22, at its terminal end. In turn, joint 22 is provided with mounting means for the device 10, such as a suction cup 24 in the illustrative FIG. 2 form of the invention. Cup 24 may be readily detachable from the ball-socket element, as by a threaded connection, to permit selective utilization of other mounting means, as noted hereinafter.

Housing 12 is suitably recessed at 26, whereby the terminal end of section 18a and the mounting means such as suction cup 24 affixed thereto may be substantially entirely received within the peripheral outline of the device 10 when unit 18 is fully telescoped, thereby to enhance the compact and attractive character of the device.

Telescoping unit 20 includes at the terminal end of innermost extensible member 20a a like pivot means, comprising ball and socket joint 28. The joint 28 in turn is affixed to coverlike portion 30 of the illumination unit 16.

It will therefore be seen that either sectional unit 18 or 20 may be telescopically extended outwardly to any desired point within its maximum length, and the mounting means 24 as well as the illumination unit cover 30 may each be pivoted to a selected angular position by virtue of the respective ball and socket joints 22, 28.

When unit 20 is in fully retracted position as seen in FIG. 2, cover 30 of illumination unit 16 is in telescoping relation to housing 12 and the associated portion of battery compartment cover 15, thereby defining the compact, substantially rectangular configuration of the device as seen in FIG. 1.

The illumination head or unit 16 carries a clear lens-bulb assembly 32 for throwing a white beam, and a red lens-bulb assembly 34 whose red beam when illuminated prevents loss of dark-adaptation during night operations. Either desired lamp thereof may be selected for illumination by means of switch 36 in known manner. Cover 30 also carries On-Off switch 38. Desirably, a suitable clip 40 is provided within the cover 30 for storing a spare lamp.

Portable power means for the illumination unit 16 is provided by battery B disposed within battery compartment 14, and releasably retained therein as by a spring clip 42. Preferably, the battery B is of a rechargeable type, and may be associated with housing 12 in such a manner so as to be disposed for recharging without bodily removal therefrom. Alternatively, and as illustrated herein, the battery B is removable from compartment 15 and may have a removable end closure 46 which normally conceals electric prongs for association with a conventional recharging unit.

Current is supplied from the battery to the illumination unit 16 by means of connector 48 and leads 50. To simplify the wiring thereof, in the illustrated device one lead 50 is affixed to outer section 20c of metallic telescoping unit 20, while counterpart lead 52 in the illumination unit 16 is likewise electrically connected to the innermost section 20a thereof. The other lead 50, coiled to provide maximum extensibility, passes through the tubular member 20a and out through a lateral opening therein to switch 38 and from thence to selector switch 36, from which leads pass to the lamp assemblies 32, 34 in known manner.

The connector 48 associated with battery B may also be modified to provide thereon an additional plug-in jack member 56, whereby the connector 48 may be removed from the battery B and plugged in by means of jack 56 to a suitable external power supply outlet available in an aircraft or other environment, whereby power drain on the battery is eliminated where portability is not necessary.

As aforesaid, in lieu of suction cup 24 in FIG. 2, the telescoping unit 18 may be provided with alternative forms of mounting means as may be found useful, such as the bracket-like assembly 58, 60 of FIG. 3. A bracket portion 60 may be affixed to a wall area of the aircraft fuselage or other surface, and a suitable dovetail member 58 may be releasably received therewithin to mount the device 10.

Likewise, the ball and socket joint 22 may be provided with an alligator clip 62 as in FIG. 4, whereby the device 10 may be readily attached to any convenient ledgelike surface. Other modes of possible connectors will be readily apparent to those skilled in the art, including hooks, "Velcro"-type connectors, etc.

Accordingly, with the structure just described, it will be readily apparent that the device 10 may be positioned as required with a maximum adjustable facility for use by virtue of the oppositely directed telescoping units 18, 20 and the associated pivot means 22, 28 at the terminal ends of innermost members 18a and 20a. Thus, as seen in FIG. 5, the telescoping assembly 18 only may be extended, or the illumination unit-carrying telescoping unit 20 may be extended as seen in FIG. 8. Likewise, both units may be extended to a greater or lesser extent as seen in FIGS. 6 and 7. Concomitantly, by virtue of the pivot or swivel assemblies 22, 28, either telescoping unit may be angled with respect to the mounting means as at 24 and the illumination unit 16 as required to throw light precisely to the locale desired, regardless of the position of a nearby mounting or support surface.

In like manner, change of position or angular relation thereof is readily effected, as well as complete telescoping of the units 18, 20 into fully collapsed condition within housing 12 thereby to provide a compact hand-held unit as seen in FIG. 1 where mounting thereof on a supporting surface is not convenient.

What is claimed is:

1. An extensible universally positionable device comprising,
   a casing of generally rectangular configuration,
   said casing including a housing, an illumination head, and a battery compartment;
   first and second telescoping sectional units normally fully received within said housing and mounted for linear projection in opposite directions therefrom,
   attachment means for said device pivotally connected to said first telescoping unit,
   an illumination head pivotally connected to said second telescoping unit,
   and electric leads extending between said battery compartment and said illumination head
   thereby to form a versatile portable and extensible light source compactly received within said casing.

2. The extensible universally positionable device of claim 1 wherein said illumination head forms a coverlike portion of said casing with respect to said housing and said battery compartment.

3. The extensible universally positionable device of claim 1 wherein said telescoping units are disposed in axial alignment within said housing.

4. The extensible universally positionable device of claim 1 wherein said illumination head includes white beam and red beam means, and switch means for selection therebetween.

5. An extensible universally positionable cockpit illumination device for aircraft comprising:
   a housing,
   first and second telescoping tubular sectional units mounted within said housing for linear telescopic extension therefrom in substantially opposite directions and fully housed retraction thereinto,
   mounting means for said device swivelly connected to said first telescoping unit,
   an electric illumination head swivelly connected to said second telescoping unit, and,
   electric leads extending between said illumination head and said housing, said leads including connection means accessible within said housing to permit connection of said illumination head to a source of electric power.

6. The device of claim 5 wherein said housing includes a compartment for receiving and holding a battery, and,
   said electric lead connection means includes a multipurpose connector for selective respective cooperative association with a battery within said compartment or with an external source of electric power.

7. The extensible universally positionable device of claim 5 wherein said illumination head includes clear lens means and red-hued lens means, and,
   switch means for effecting illuminating through a selected one of said lens means.

8. The extensible universally positionable device of claim 5 wherein said housing is provided with a recess within which said mounting means is received when said first extensible means is in fully telescoped condition.

9. The extensible universally positionable device of claim 5 wherein said mounting means includes an alligator clip.

10. The extensible universally positionable device of claim 5 wherein said mounting means includes a suction cup.

11. The extensible universally positionable device of claim 5 wherein said mounting means includes a bracket element.

12. The extensible universally positionable device of claim 5 wherein said mounting means includes "Velcro"-type hook and loop fabric means.

* * * * *